United States Patent
Doi et al.

(10) Patent No.: US 11,408,537 B2
(45) Date of Patent: Aug. 9, 2022

(54) FLUID CONTROL VALVE

(71) Applicant: SMC CORPORATION, Chiyoda-ku (JP)

(72) Inventors: Yoshitada Doi, Koshigaya (JP); Yuzuru Okita, Tsukubamirai (JP); Yoji Niimi, Tsukubamirai (JP); Hirofumi Ueda, Moriya (JP); Tsugumichi Fujiwara, Moriya (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 16/822,114

(22) Filed: Mar. 18, 2020

(65) Prior Publication Data

US 2020/0300383 A1   Sep. 24, 2020

(30) Foreign Application Priority Data

Mar. 22, 2019 (JP) .............................. JP2019-054945

(51) Int. Cl.
*F16K 47/02* (2006.01)
*F16K 37/00* (2006.01)
(Continued)

(52) U.S. Cl.
CPC .............. *F16K 47/023* (2013.01); *F16K 1/54* (2013.01); *F16K 31/1221* (2013.01);
(Continued)

(58) Field of Classification Search
CPC .... F16K 47/023; F16K 47/02; F16K 37/0008; F16K 31/1221; F16K 31/363; F16K 1/54; F16K 7/17
See application file for complete search history.

(56) References Cited

U.S. PATENT DOCUMENTS 3,648,969 A * 3/1972 Marquart ................ F15B 13/07
251/63
4,840,347 A * 6/1989 Ariizumi ............. F16K 31/1221
251/63.4
(Continued)

FOREIGN PATENT DOCUMENTS

JP          3701367 B2    9/2005
JP       2007-16977 A    1/2007
(Continued)

OTHER PUBLICATIONS

Extended European Search Report dated Aug. 20, 2020 in Patent Application No. 20163809.5, 10 pages.
(Continued)

*Primary Examiner* — Patrick C Williams
(74) *Attorney, Agent, or Firm* — Oblon, McClelland, Maier & Neustadt, L.L.P.

(57) ABSTRACT

In a fluid control valve, a cylinder chamber includes a first pilot chamber extending from a piston in one of sliding directions. An opening of a first pilot port allowing supply and discharge of fluid is formed in the inner wall of the first pilot chamber. The fluid is accommodated in the first pilot chamber when the piston is in a valve open position, and discharged via the opening when the piston is displaced toward a valve closed position. At least one of the piston and a valve body includes a throttle portion forming, between the piston and the valve body, a throttle path having a cross-sectional area smaller than the area of the opening, after the piston starts being displaced from the valve open position toward the valve closed position.

4 Claims, 16 Drawing Sheets

(51) Int. Cl.
  *F16K 31/122* (2006.01)
  *F16K 1/54* (2006.01)
  *F16K 31/363* (2006.01)
  *F16K 7/17* (2006.01)

(52) U.S. Cl.
  CPC ........ *F16K 31/363* (2013.01); *F16K 37/0008* (2013.01); *F16K 47/02* (2013.01); *F16K 7/17* (2013.01)

(56) References Cited

U.S. PATENT DOCUMENTS

| | | | |
|---|---|---|---|
| 5,779,224 A | 7/1998 | Fukano et al. | |
| 6,000,416 A * | 12/1999 | Kingsford | F16K 41/103 137/1 |
| 7,434,780 B2 | 10/2008 | Hayashi et al. | |
| 2006/0027606 A1 | 2/2006 | Fukano et al. | |
| 2009/0020722 A1 * | 1/2009 | Masamura | F16K 31/122 251/331 |
| 2016/0123491 A1 * | 5/2016 | Chiba | F16K 31/1226 156/345.24 |
| 2017/0152964 A1 * | 6/2017 | Eberhard | F16K 31/1221 |

FOREIGN PATENT DOCUMENTS

| | | |
|---|---|---|
| JP | 2007-170583 A | 7/2007 |
| JP | 2012-219826 A | 11/2012 |

OTHER PUBLICATIONS

Office Action dated Nov. 9, 2021 issued in corresponding Japanese patent application No. 2019-054945 (with English machine translation).

* cited by examiner

FLUID CONTROL VALVE

CROSS-REFERENCE TO RELATED APPLICATION

This application is based upon and claims the benefit of priority from Japanese Patent Application No. 2019-054945 filed on Mar. 22, 2019, the contents of which are incorporated herein by reference.

BACKGROUND OF THE INVENTION

Field of the Invention

The present invention relates to fluid control valves for separating and seating valve discs from and on valve seats using working fluid.

Description of the Related Art

Some known fluid control valves control the passage of fluid to be controlled inside flow paths by separating and seating valve discs from and on valve seats provided in the flow paths of the fluid to be controlled using working fluid. In a case where fluid control valves of this type are used for, for example, semiconductor production, which requires highly clean fluid to be controlled, it is important to prevent particles from entering flow paths. Such particles include, for example, flakes separated from the valve discs or the valve seats due to impact occurring when the valve discs are seated on the valve seats.

To prevent the flaking or the like, a fluid control valve capable of reducing impact occurring when a valve disc is seated on a valve seat is proposed in Japanese Patent No. 3701367. The fluid control valve includes a valve body provided with a cylinder chamber and a damper member and a piston slidable inside the cylinder chamber. The piston includes a pressure receiving surface and is displaced together with the valve disc in an integrated manner under working pressure in accordance with the pressure of working fluid or the like applied on the pressure receiving surface. This causes the valve disc to be separated from and seated on the valve seat.

The damper member provided for the valve body functions as a shock absorber when brought into contact with the piston. When the valve disc approaches the valve seat as the piston is displaced as described above, the piston comes into contact with the damper member before the valve disc is seated on the valve seat. The valve disc is seated on the valve seat after the piston is further displaced while elastically deforming the damper member. In this manner, the valve disc is seated on the valve seat at a speed reduced by the displacement of the piston against the elastic force of the damper member. Thus, the impact occurring during the seating can be reduced compared with, for example, a case where the piston is displaced without using a damper member. As a result, flaking or the like can be prevented.

SUMMARY OF THE INVENTION

However, in the case where the piston is displaced against the elastic force of the damper member as described above, more working pressure, corresponding to the elastic force of the damper member, is required to seat the valve disc on the valve seat. To achieve this, the area of the pressure receiving surface needs to be increased. This may increase the size of, for example, the piston or the cylinder chamber, and as a result, increase the size of the fluid control valve.

The present invention has been devised taking into consideration the aforementioned problems, and has the object of providing a fluid control valve capable of reducing impact occurring when a valve disc is seated on a valve seat without being increased in size.

A fluid control valve according to an aspect of the present invention comprises a valve body provided with a flow path of fluid to be controlled, and a cylinder chamber, a piston configured to slide inside the cylinder chamber in sliding directions under working pressure, and a valve disc displaced together with the piston in an integrated manner to be separated from and seated on a valve seat provided in the flow path to open and close the flow path, wherein the cylinder chamber includes a pilot chamber extending from the piston in one of the sliding directions, an opening of a port is created in an inner wall of the pilot chamber, fluid being supplied to and discharged from the pilot chamber through the opening, the fluid is accommodated in the pilot chamber when the piston is in a valve open position in which the valve disc is separated from the valve seat, the fluid inside the pilot chamber is discharged to the port via the opening when the piston is displaced toward a valve closed position in which the valve disc is seated on the valve seat, and at least one of the piston and the valve body is provided with a throttle portion forming, between the piston and the valve body, a throttle path having a cross-sectional area smaller than an area of the opening, after the piston starts being displaced from the valve open position toward the valve closed position.

In the fluid control valve, valve closing pressure toward the valve closed position and valve opening pressure toward the valve open position can be applied to the piston. When the valve closing pressure applied to the piston in the valve open position is higher than the valve opening pressure, the piston is displaced toward the valve closed position while the fluid inside the pilot chamber is discharged from the opening to the port. The fluid here includes, for example, working fluid supplied to the pilot chamber to move the piston toward the valve open position or the air filling the pilot chamber since the piston is in the valve open position. At this moment, by reducing the discharge rate of the fluid discharged from the pilot chamber to the port, the internal pressure in the pilot chamber increases, and the displacement speed of the piston in accordance with the magnitude of the valve closing pressure decreases.

The throttle portion forms, between the piston and the valve body, the throttle path having a cross-sectional area smaller than the area of the opening, after the piston starts being displaced from the valve open position toward the valve closed position. The fluid is discharged to the outside of the opening via the throttle path. Thus, the discharge rate of the fluid discharged from the pilot chamber can be reduced before the valve disc, which has approached the valve seat, is seated on the valve seat so that the displacement speed of the piston in accordance with the magnitude of the valve closing pressure can be reduced. As a result, the valve disc can be seated on the valve seat at low speed, and impact occurring when the valve disc is seated on the valve seat can be reduced.

Moreover, the fluid can be discharged to the outside of the opening at a flow rate in accordance with the cross-sectional area of the throttle path even when the throttle path is formed by the throttle portion. That is, the increased internal pressure in the pilot chamber decreases in a short time by forming the throttle path. Thus, the piston can be displaced to the valve closed position without increasing the valve closing pressure, in other words, without increasing, for example, the diameter of the piston or the cylinder chamber.

In this manner, according to the present invention, the fluid control valve enables the valve disc to be seated on the valve seat at low speed to reduce the impact occurring during the seating, without being increased in size.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Figure 1:
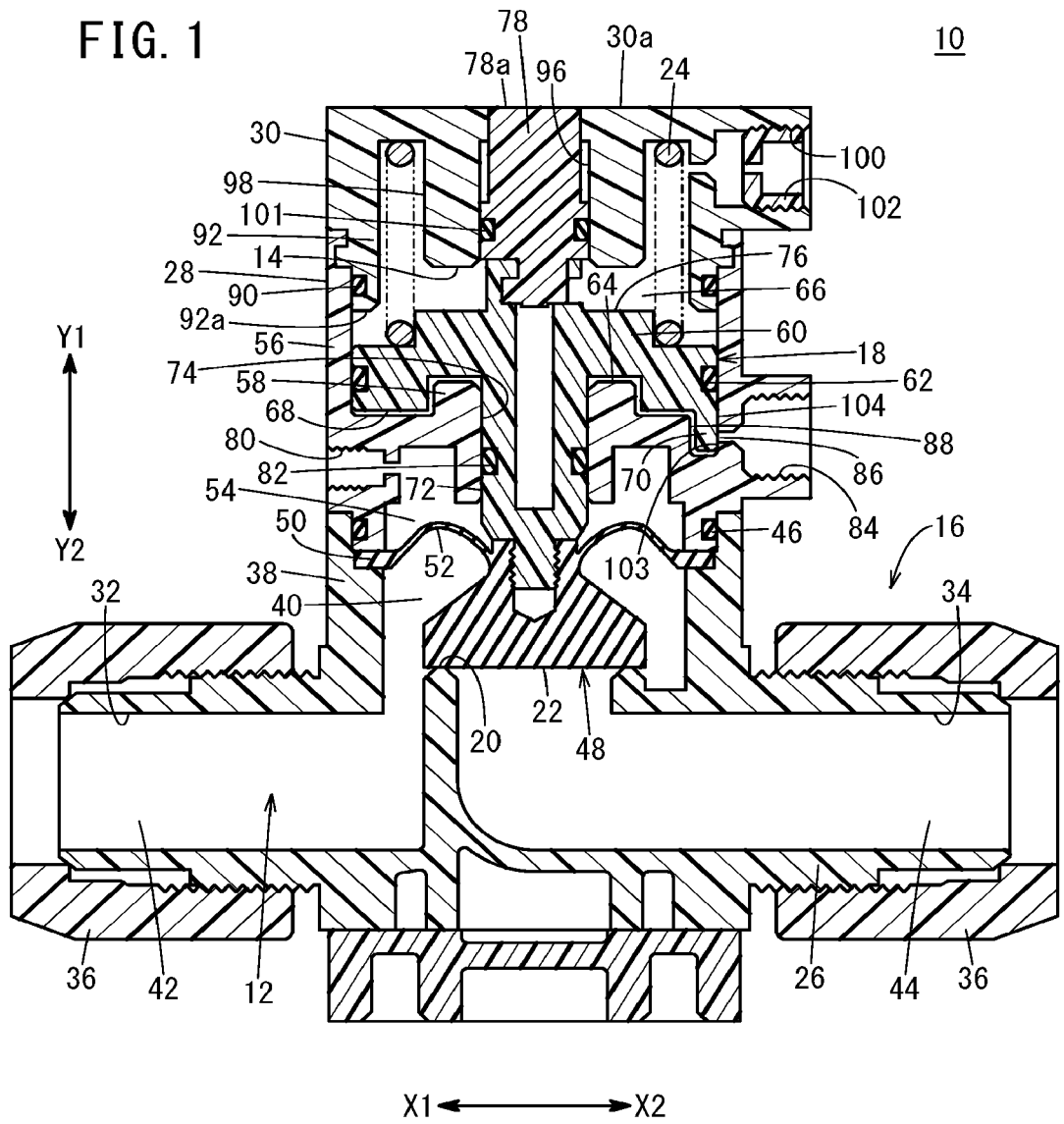
FIG. 1 is a schematic cross-sectional view of a fluid control valve according to a first embodiment of the present invention.

Preferred embodiments of a fluid control valve according to the present invention will be described in detail below with reference to the accompanying drawings. In the drawings, the same reference numerals and symbols are used for components having identical or similar functions and effects, and the repeated descriptions may be omitted.

A fluid control valve 10 according to a first embodiment can be suitably applied to, for example, components installed in fluid channels of semiconductor manufacturing equipment or the like, although not illustrated in FIGS. 1 to 4. In the description below, the fluid control valve 10 serves as a component controlling flow of fluid to be controlled such as chemical solution flowing in fluid channels of semiconductor manufacturing equipment. However, the use of the fluid control valve 10 is not limited to semiconductor production and can control flow of various types of fluid serving as fluid to be controlled.

As illustrated in FIG. 1, the fluid control valve 10 includes a valve body 16 provided with a flow path 12 of fluid to be controlled, and a cylinder chamber 14, a piston 18 slidable inside the cylinder chamber 14 in sliding directions (directions of arrows Y1 and Y2; hereinafter arrows Y1 and Y2 are simply referred to as Y1 and Y2), a valve disc 22 displaced together with the piston 18 in an integrated manner to be separated from and seated on a valve seat 20 provided in the flow path 12 to open and close the flow path 12, and a biasing member 24 biasing the piston 18 toward a valve closed position. That is, the fluid control valve 10 is of the normally closed type in which the valve disc 22 is normally seated on the valve seat 20 by the elastic force of the biasing member 24.

The valve body 16 is composed of, for example, a material with high corrosion resistance and chemical resistance and includes a body core 26, a first housing 28, and a second housing 30. Materials suitable for the body core 26 include perfluoroalkoxy alkane (PFA), polytetrafluoroethylene (PTFE), polyphenylene sulfide (PPS), and stainless steel (SUS). Materials suitable for the first housing 28 and the second housing 30 include polyvinylidene difluoride (PVDF), PPS, polybutylene terephthalate (PBT), and polypropylene (PP).

As illustrated in FIG. 1, the body core 26 has a primary port 34 at an end on an arrow X2 side, and a secondary port 32 at an end on an arrow X1 side (hereinafter arrows X1 and X2 are simply referred to as X1 and X2). The flow path 12 extending in the X1 and X2 directions is provided between the primary port 34 and the secondary port 32. The primary port 34 and the secondary port 32 can be connected to, for example, fluid pipes and the like (not illustrated) constituting the fluid channels of the above-described semiconductor manufacturing equipment via nuts 36. The flow path 12 may allow the passage of the fluid to be controlled from the primary port 34 toward the secondary port 32 (in the X1 direction) and from the secondary port 32 toward the primary port 34 (in the X2 direction).

The body core 26 is provided with a valve chamber forming portion 38 substantially in the middle in the direction of extension of the flow path 12. The valve chamber forming portion 38 extends in a direction orthogonal to the direction of extension (in the Y1 and Y2 directions). A valve chamber 40 communicating with the flow path 12 is formed inside the valve chamber forming portion 38. The flow path 12 includes a primary path 44 connecting the primary port 34 and the valve chamber 40, and a secondary path 42 connecting the secondary port 32 and the valve chamber 40. The valve seat 20 is provided in the primary path 44 at an end facing the valve chamber 40.

Thus, when the valve disc 22 is seated on the valve seat 20, the communication between the primary port 34 and the valve chamber 40 is blocked, and thereby the communication between the primary port 34 and the secondary port 32 is blocked. On the other hand, when the valve disc 22 is separated from the valve seat 20 (see FIG. 2), the primary port 34 and the valve chamber 40 communicate with each other, and the primary port 34 and the secondary port 32 communicate with each other via the valve chamber 40.

The first housing 28 is airtightly connected, via an O-ring 46, to an end of the valve chamber forming portion 38 on the Y1 side. Moreover, an outer peripheral edge portion 50 of a diaphragm valve 48, which includes the valve disc 22, is held between the end of the valve chamber forming portion 38 on the Y1 side and an end of the first housing 28 on the Y2 side connected to each other.

The diaphragm valve 48 is composed of, for example, a material with high corrosion resistance and chemical resistance such as PTFE, fluoroelastomer containing vinylidene fluoride (FKM), fluoroelastomer containing tetrafluoroethylene propylene (FEPM), and ethylene propylene diene terpolymer (EPDM). In addition to the outer peripheral edge portion 50 and the valve disc 22, the diaphragm valve 48 includes a thin portion 52 disposed between the outer peripheral edge portion 50 and the valve disc 22. The thin portion 52 can be deformed according to the displacement of the valve disc 22. The diaphragm valve 48 fluid tightly partitions the valve chamber 40 into a space extending from the thin portion 52 in the Y1 direction and a space extending from the thin portion 52 in the Y2 direction. In the description below, the space of the valve chamber 40 extending from the thin portion 52 in the Y1 direction will also be referred to as a diaphragm chamber 54.

Figure 2:
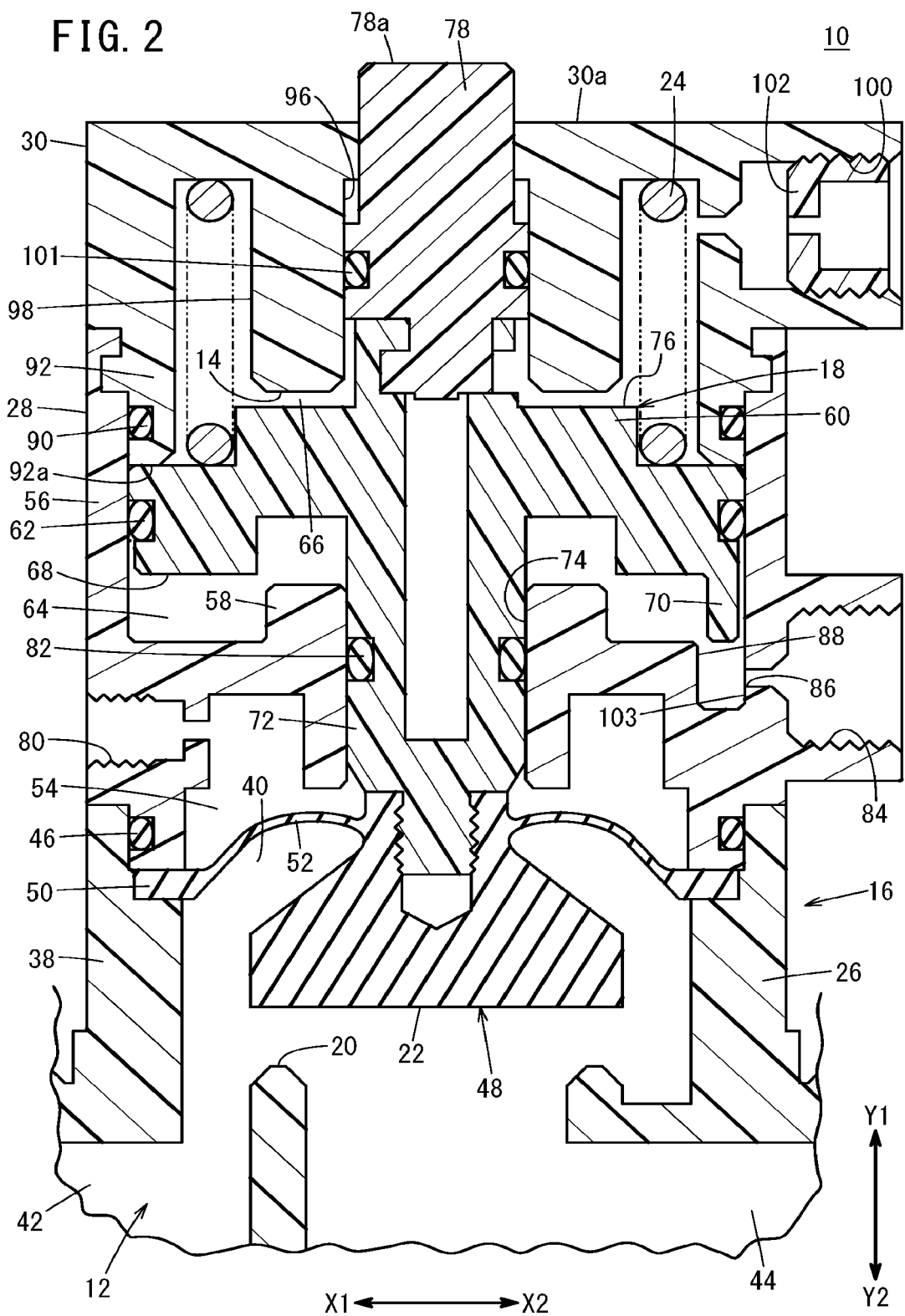
FIG. 2 is an enlarged cross-sectional view of a principal part of the fluid control valve in FIG. 1 when the valve is open.

As illustrated in FIG. 2, the first housing 28 includes a tubular portion 56 extending in the Y1 and Y2 directions and a flange portion 58 protruding from the inner wall of the tubular portion 56 toward the axis center. Part of the tubular portion 56 extending from the flange portion 58 in the Y2 direction, an end face of the flange portion 58 on the Y2 side, and the valve chamber forming portion 38 form the valve chamber 40. Part of the tubular portion 56 extending from the flange portion 58 in the Y1 direction, an end face of the flange portion 58 on the Y1 side, and the second housing 30 form the cylinder chamber 14.

A piston body portion 60 of the piston 18 is disposed inside the cylinder chamber 14, and the outer circumferential surface of the piston body portion 60 can slide on the inner wall surface of the tubular portion 56. An O-ring 62 is disposed between the outer circumferential surface of the piston body portion 60 and the inner wall surface of the tubular portion 56. As a result, the cylinder chamber 14 is partitioned into a first pilot chamber 64 (pilot chamber) extending from the O-ring 62 of the piston 18 in one of the sliding directions (Y2 direction), and a second pilot chamber 66 extending in the other direction (Y1 direction). Materials suitable for the piston 18 include, for example, materials similar to those for the first housing 28 and the second housing 30.

A first pressure receiving surface 68 facing the first pilot chamber 64 is provided on the Y2 side of the piston body portion 60. Moreover, a throttle portion 70 extending from a circumferential part of the first pressure receiving surface 68 in the Y2 direction is provided on the outer circumference side of the piston body portion 60. The throttle portion 70 may have a ring shape extending, in the Y2 direction, from the entire first pressure receiving surface 68 in the circumferential direction. The throttle portion 70 will be described in detail below. A rod portion 72 extends in the sliding direction (Y2 direction) from an end of the piston body portion 60 on the Y2 side at a position adjacent to the radial center of the piston body portion 60. The rod portion 72 is formed of the same base material as the piston body portion 60.

The rod portion 72 slidably passes through a rod insertion hole 74 created in the flange portion 58 at a position adjacent to the radial center, and the tip of the rod portion 72 is disposed inside the valve chamber 40. The valve disc 22 can be displaced together with the piston 18 in an integrated manner by securing the valve disc 22 to the tip of the rod portion 72.

A second pressure receiving surface 76 facing the second pilot chamber 66 is provided on the Y1 side of the piston body portion 60. Moreover, an indicator 78 is connected to an end of the piston body portion 60 on the Y1 side at a position adjacent to the radial center of the piston body portion 60.

A breather port 80 communicating with the diaphragm chamber 54 is created in the tubular portion 56 of the first housing 28. The diaphragm chamber 54 is exposed to the atmosphere through the breather port 80. Communication between the diaphragm chamber 54 and the cylinder chamber 14 is blocked by an O-ring 82 disposed between the rod portion 72 and the inner wall of the rod insertion hole 74.

Moreover, a first pilot port 84 (port) communicating with the first pilot chamber 64 is created in the tubular portion 56. That is, an opening 86 of the first pilot port 84 is formed in the inner wall of the first pilot chamber 64. In the first embodiment, the flange portion 58 has an accommodating recess 88 in the end face on the Y1 side. When the piston 18 is in the valve closed position in which the valve disc 22 is seated on the valve seat 20, the throttle portion 70 enters the accommodating recess 88. The opening 86 of the first pilot port 84 faces the inside of the accommodating recess 88.

The second housing 30 is airtightly connected, via an O-ring 90, to an end of the tubular portion 56 on the Y1 side. Specifically, an insertion barrel portion 92 with an outer diameter smaller than the inner diameter of the tubular portion 56 is provided for an end of the second housing 30 on the Y2 side, and the insertion barrel portion 92 is fitted in the tubular portion 56. This connects the first housing 28 and the second housing 30. Moreover, the O-ring 90 is disposed between the inner wall of the tubular portion 56 and the outer wall of the insertion barrel portion 92. When the piston 18 is displaced in the Y1 direction, the piston body portion 60 comes into contact with an end face 92a of the insertion barrel portion 92. This contact restricts further displacement of the piston 18 in the Y1 direction.

The second housing 30 is provided with an indicator insertion hole 96 in which the indicator 78 is fitted to be slidable, an accommodating groove 98 in which the biasing member 24, which is a spring composed of SUS and the like, is accommodated, and a second pilot port 100 communicating with the second pilot chamber 66.

Figure 3:
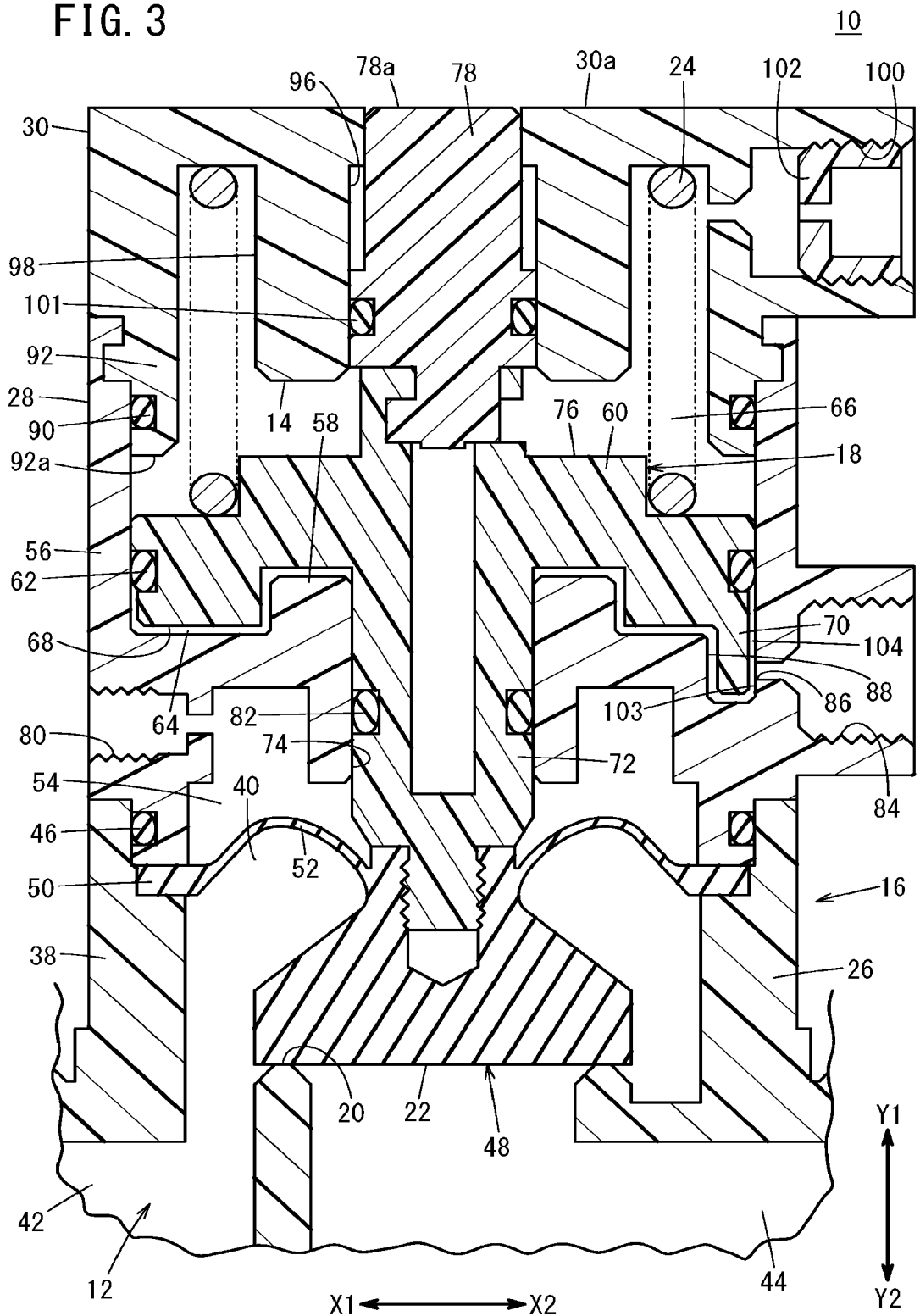
FIG. 3 is an enlarged cross-sectional view of the principal part of the fluid control valve in FIG. 1 when the valve is closed.

For example, the indicator 78 is composed of a material such as PVDF or PP and has a rod shape. The indicator 78 is displaced inside the indicator insertion hole 96 in the Y1 and Y2 directions together with the piston 18 in an integrated manner. As illustrated in FIG. 3, when the piston 18 is in the valve closed position in which the valve disc 22 is seated on the valve seat 20, for example, an end face 78a of the indicator 78 on the Y1 side and an end face 30a of the second housing 30 on the Y1 side are flush with each other.

On the other hand, as illustrated in FIG. 2, when the piston 18 is in a position in which the piston body portion 60 is in contact with the end face 92a of the insertion barrel portion 92, in other words, when the piston 18 is in a valve open position in which the valve disc 22 is separated from the valve seat 20, the end face 78*a* of the indicator 78 protrudes from the end face 30*a* of the second housing 30 in the Y1 direction.

Thus, it is possible to determine whether the valve disc 22 is seated on the valve seat 20 inside the valve body 16 by checking the position of the end face 78*a* of the indicator 78. An O-ring 101 is disposed between the indicator 78 and the inner wall of the indicator insertion hole 96, and thereby communication between the cylinder chamber 14 and the outside via the indicator insertion hole 96 is blocked. Materials suitable for the above-described O-rings 46, 62, 82, 90, and 101 include FEPM, FKM, and EPDM.

The inside of the accommodating groove 98 communicates with the second pilot chamber 66. The biasing member 24 is disposed between the accommodating groove 98 and the second pressure receiving surface 76 of the piston 18 such that energy is stored in the biasing member 24. Thus, the piston 18 is elastically biased in a direction along which the valve disc 22 is seated on the valve seat 20 (in the Y2 direction) at all times. That is, the elastic force of the biasing member 24 serves as a valve closing pressure causing the piston 18 to move toward the valve closed position.

In the fluid control valve 10 of the above-described normally closed type, a supply source of working fluid (not illustrated) is connected to the first pilot port 84. The working fluid includes, for example, compressed air and nitrogen gas. As illustrated in FIG. 3, while the working fluid is not supplied from the supply source of the working fluid, the piston 18 is in the valve closed position by the valve closing pressure by the biasing member 24. Thus, the valve disc 22 is seated on the valve seat 20, and the communication between the primary port 34 (FIG. 1) and the secondary port 32 (FIG. 1) is blocked.

When the working fluid is supplied from the supply source of the working fluid to the first pilot chamber 64 via the first pilot port 84 and the opening 86, the internal pressure in the first pilot chamber 64 increases. Consequently, the first pressure receiving surface 68 receives a valve opening pressure, at a level in accordance with the pressure of the working fluid inside the first pilot chamber 64, causing the piston 18 to move toward the valve open position. When the valve opening pressure exceeds the elastic force (valve closing pressure) of the biasing member 24, the piston 18 is displaced toward the valve open position (in the Y1 direction). As a result, the valve disc 22 is separated from the valve seat 20 as illustrated in FIG. 2, and the primary port 34 (FIG. 1) and the secondary port 32 (FIG. 1) communicate with each other.

That is, when the piston 18 is in the valve open position, the working fluid (fluid) at a predetermined pressure is accommodated in the first pilot chamber 64. When the supply of the working fluid from the supply source of the working fluid is stopped, the working fluid inside the first pilot chamber 64 starts being discharged to the outside of the first pilot port 84 via the opening 86.

When the internal pressure inside the first pilot chamber 64 decreases by the discharge, the valve opening pressure applied to the first pressure receiving surface 68 decreases. Subsequently, when the valve opening pressure becomes lower than the valve closing pressure applied to the second pressure receiving surface 76 via the biasing member 24, the piston 18 is displaced toward the valve closed position (in the Y2 direction). The working fluid inside the pilot chamber 64 is discharged to the first pilot port 84 via the opening 86 also at this moment.

The second pilot port 100 functions as a breather port through which the second pilot chamber 66 is exposed to the atmosphere. Thus, when the piston 18 is in the valve closed position, the second pilot chamber 66 accommodates the air taken in via the second pilot port 100. In a case where the environment of the fluid control valve 10 is filled with fluid other than the air, the second pilot chamber 66 may accommodate the fluid. Since a supply source or the like of the working fluid does not need to be connected to the second pilot port 100, a port plug 102 may be fitted in the second pilot port 100 instead of piping and the like for connecting the supply source. The opening of the second pilot port 100 is provided in the inner wall of the accommodating groove 98.

The throttle portion 70 in the fluid control valve 10 according to the first embodiment will now be described in detail in relation with the opening 86 of the first pilot port 84. When the piston 18 is displaced from the valve open position toward the valve closed position by a predetermined distance, the throttle portion 70 covers the overall opening 86 and a peripheral portion 103 around the opening 86 in the inner wall of the first pilot chamber 64 as illustrated in FIG. 3. At this moment, a throttle path 104 having a cross-sectional area smaller than the area of the opening 86 and allowing communication between the opening 86 and the first pilot chamber 64 is formed between the peripheral portion 103 and the throttle portion 70.

When the throttle path 104 is formed in this manner, the working fluid inside the first pilot chamber 64 is discharged to the outside of the opening 86 via the throttle path 104. Moreover, the communication between the first pilot chamber 64 and the first pilot port 84 is maintained via the throttle path 104 also after the piston 18 reaches the valve closed position. Furthermore, the working fluid supplied to the first pilot port 84 also flows into the first pilot chamber 64 via the throttle path 104.

Figure 4:
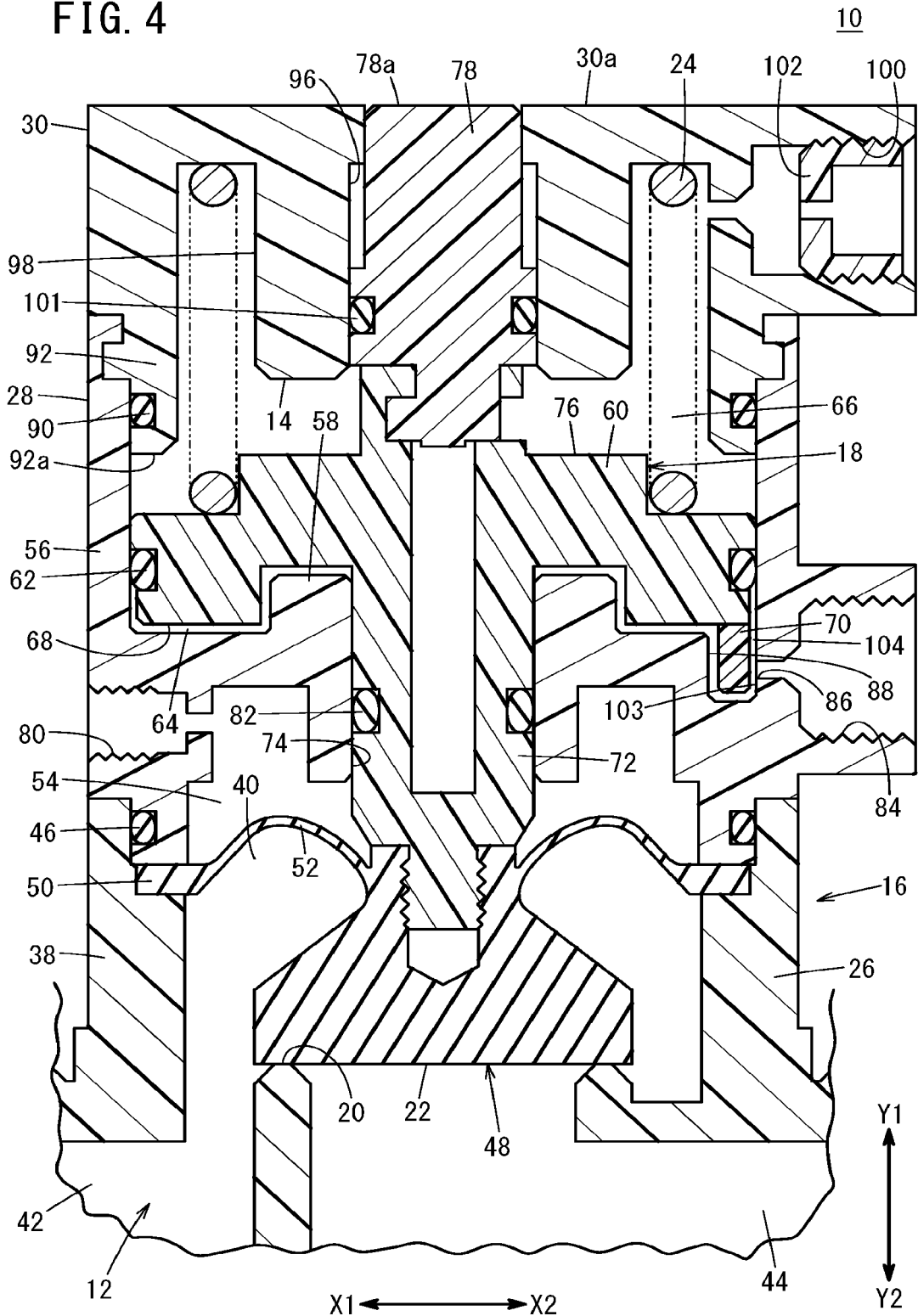
FIG. 4 is an enlarged cross-sectional view of the principal part illustrating a throttle portion according to a modification of the embodiment in FIG. 1.

As illustrated in FIGS. 1 to 3, the throttle portion 70 may be formed of the same base material as the piston 18. Alternatively, the throttle portion 70 may be formed separately from the piston 18 and then integrated with the piston body portion 60 to constitute the piston 18 as illustrated in FIG. 4. In the case where the throttle portion 70 and the piston 18 are separate components, materials suitable for the throttle portion 70 include the same resin material as the piston 18, rubber materials such as FEPM, FKM, EPDM, nitrile rubber (NBR), and silicone rubber, and elastomer materials such as polyurethane elastomer and thermoplastic polyester elastomer (TEES).

The fluid control valve 10 according to the first embodiment is basically configured as above. When the fluid control valve 10 is operated, although not illustrated, the primary port 34 and the secondary port 32 are connected to fluid pipes of the above-described semiconductor manufacturing equipment via the nuts 36 so that the flow path 12 of the fluid control valve 10 is interposed between the fluid channels. In addition, the supply source of the working fluid is connected to the first pilot port 84.

In a case where the primary port 34 is connected to an upstream fluid channel and the secondary port 32 is connected to a downstream fluid channel, the fluid to be controlled can pass through the flow path 12 from the primary port 34 toward the secondary port 32 (in the X1 direction). On the other hand, in a case where the primary port 34 is connected to the downstream fluid channel and the secondary port 32 is connected to the upstream fluid channel, the fluid to be controlled can pass through the flow path 12 from the secondary port 32 toward the primary port 34 (in the X2 direction).

To allow the passage of the fluid to be controlled through the fluid channels by changing the flow path 12 from a closed state (FIG. 3) to an open state (FIG. 2) using the fluid control valve 10, the working fluid is supplied to the first pilot chamber 64 via the first pilot port 84 and the opening 86. This increases the internal pressure in the first pilot chamber 64, and, when the valve opening pressure exceeds the valve closing pressure, the piston 18 is displaced toward the valve open position. The displacement causes the valve disc 22 to be separated from the valve seat 20 and allows the passage of the fluid to be controlled through the fluid channels via the primary port 34 and the secondary port 32 communicating with each other, that is, the flow path 12 in the open state.

To block the passage of the fluid to be controlled through the fluid channels by changing the flow path 12 from the open state (FIG. 2) to the closed state (FIG. 3) using the fluid control valve 10, the supply of the working fluid to the first pilot port 84 is stopped. This causes the working fluid inside the first pilot chamber 64 to be discharged to the first pilot port 84 via the opening 86 and thus reduces the internal pressure in the first pilot chamber 64.

As a result, the valve opening pressure becomes lower than the valve closing pressure, and the piston 18 can be displaced toward the valve closed position. The displacement causes the valve disc 22 to be seated on the valve seat 20, and thus the communication between the primary port 34 and the secondary port 32 is blocked. Since the flow path 12 is brought into the closed state, the passage of the fluid to be controlled through the fluid channels can be stopped.

In the fluid control valve 10, while the flow path 12 is changed from the open state to the closed state as described above, the throttle portion 70 enters the accommodating recess 88 as illustrated in FIG. 3 when the piston 18 is displaced from the valve open position toward the valve closed position by a predetermined distance. As a result, the throttle portion 70 covers the opening 86 facing the inside of the accommodating recess 88 and the peripheral portion 103, and thereby forms the throttle path 104.

In this case, since the working fluid is discharged to the outside of the opening 86 via the throttle path 104, the discharge rate of the working fluid discharged from the first pilot chamber 64 to the first pilot port 84 is reduced. This increases the internal pressure in the first pilot chamber 64 and thus reduces the displacement speed of the piston 18 in accordance with the magnitude of the valve closing pressure.

That is, in the fluid control valve 10, the discharge rate of the working fluid discharged from the first pilot chamber 64 is reduced before the valve disc 22, which has approached the valve seat 20, is seated on the valve seat 20 so that the displacement speed of the piston 18 is reduced. As a result, the valve disc 22 can be seated on the valve seat 20 at low speed, and the impact occurring when the valve disc 22 is seated on the valve seat 20 can be reduced.

Moreover, the working fluid can be discharged to the outside of the opening 86 at a flow rate in accordance with the cross-sectional area of the throttle path 104 even when the throttle path 104 is formed by the throttle portion 70. That is, the increased internal pressure in the first pilot chamber 64 decreases in a short time by forming the throttle path 104. Thus, the piston 18 can be displaced to the valve closed position without increasing the valve closing pressure, in other words, without increasing, for example, the diameter of the piston 18 or the cylinder chamber 14. In this manner, the fluid control valve 10 enables the valve disc 22 to be seated on the valve seat 20 at low speed to reduce the impact occurring during the seating, without being increased in size.

Since the impact occurring during the seating can be reduced as described above, flaking (not illustrated) from the valve disc 22, the valve seat 20, and the like can be prevented. As a result of no or less flakes entering the flow path 12, the fluid to be controlled can be kept clean, and the durability of the valve disc 22 and the valve seat 20 can be improved.

Moreover, the throttle portion 70 reduces the discharge rate of the working fluid after the piston 18 starts being displaced from the valve open position toward the valve closed position. In other words, the discharge rate of the working fluid is not reduced until the piston 18 is displaced from the valve open position toward the valve closed position by a predetermined distance. This prevents the displacement speed of the piston 18 from being reduced, and thus the piston 18 can be displaced at normal displacement speed until the piston 18 approaches the valve closed position from the valve open position to some extent.

Thus, for example, unlike a case where the opening 86 in the inner wall of the first pilot chamber 64 has a small area set in advance such that the piston 18 is displaced at a speed enabling the impact occurring when the valve disc 22 is seated to be reduced, the time between when the piston 18 starts being displaced toward the valve closed position and when the valve disc 22 is seated can be reduced.

Furthermore, in the fluid control valve 10, also when the piston 18 is displaced from the valve closed position toward the valve open position, the throttle path 104 still remains until the piston 18 is displaced from the valve closed position toward the valve open position by a predetermined distance. That is, the working fluid flows into the first pilot chamber 64 via the throttle path 104. This enables the valve disc 22 to be separated from the valve seat 20 at low speed. Then, after the valve disc 22 is separated from the valve seat 20, the piston 18 can be displaced to the valve open position at normal displacement speed.

Consequently, the fluid control valve 10 enables the valve disc 22 to be seated on the valve seat 20 at low speed and to be separated from the valve seat 20 at low speed as well. Thus, the fluid to be controlled is prevented from undergoing sudden changes in pressure during opening and closing of the valve disc 22, and phenomena such as water hammer and cavitation can be effectively eliminated or reduced.

Figure 5:
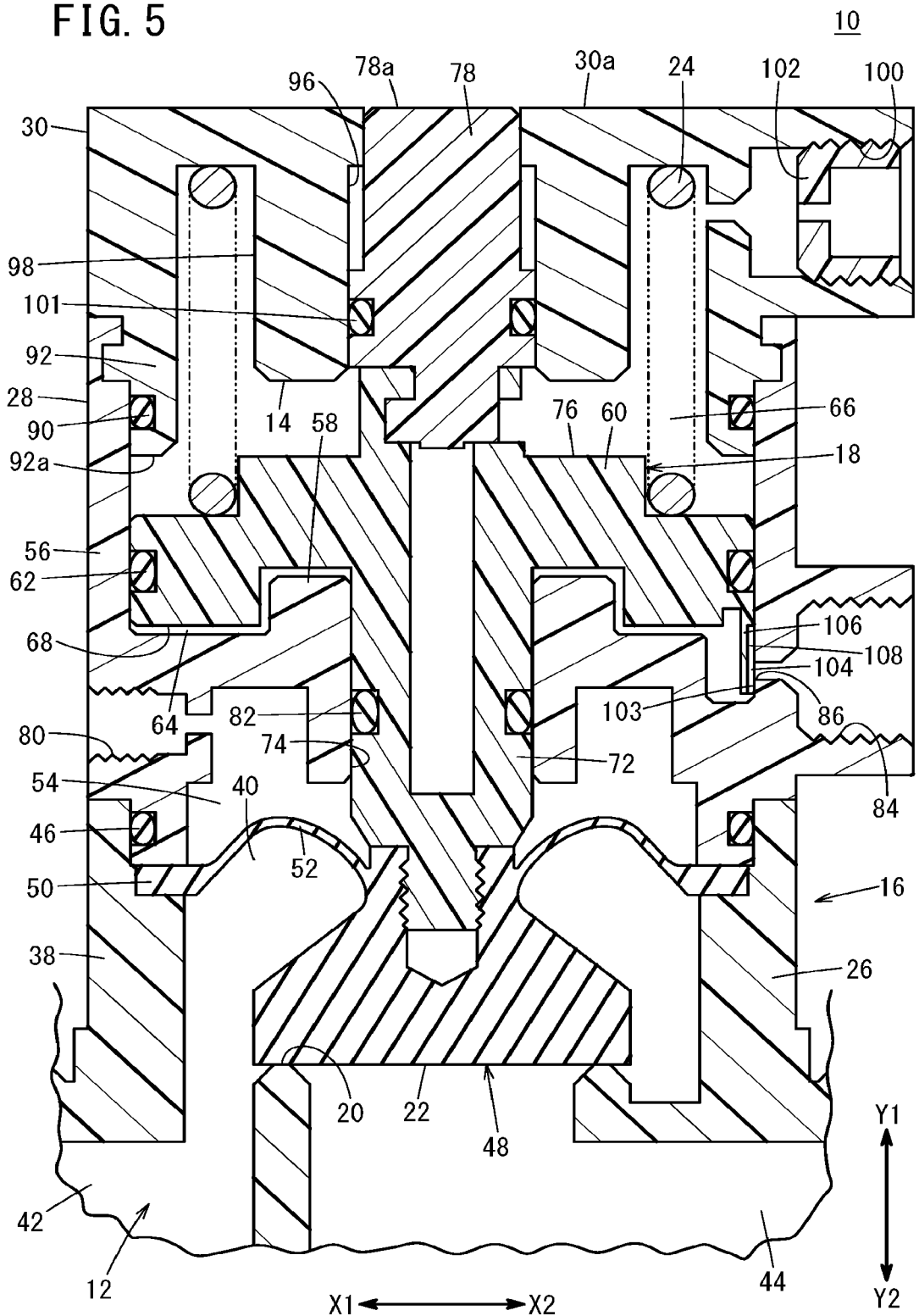
FIG. 5 is an enlarged cross-sectional view of the principal part illustrating a state before a throttle portion according to another modification of the embodiment in FIG. 1 is elastically deformed.
Figure 6:
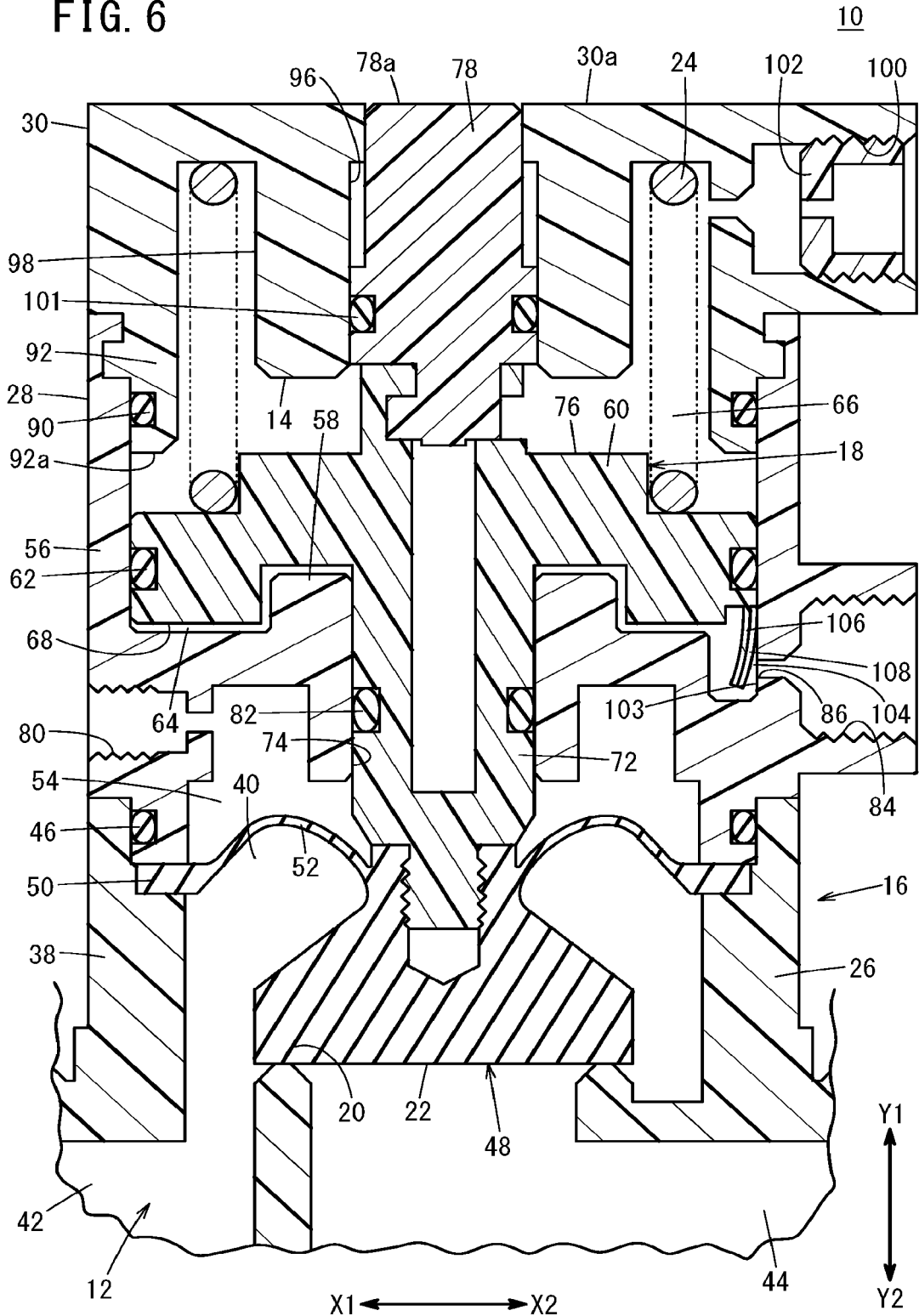
FIG. 6 is an enlarged cross-sectional view of the principal part illustrating a state after the throttle portion in FIG. 5 is elastically deformed.
Figure 7:
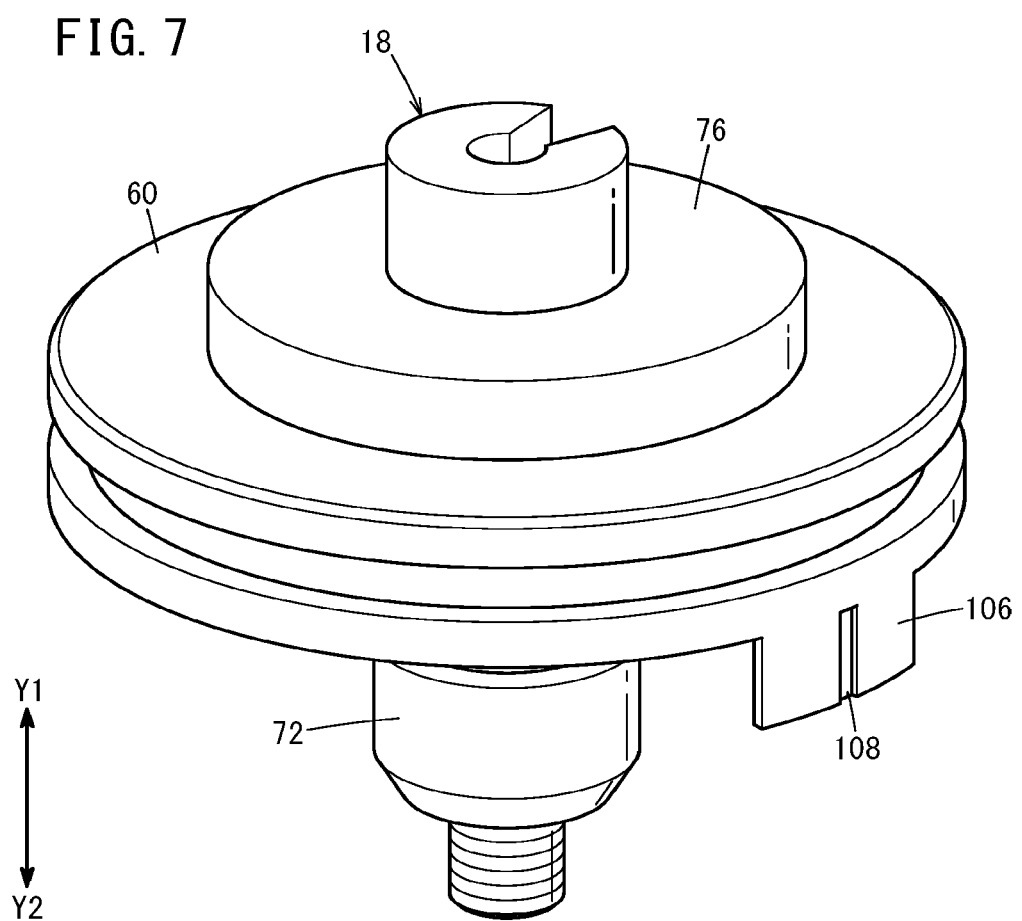
FIG. 7 is a perspective view of a piston provided with the throttle portion in FIG. 5.

To prevent a reduction in the speed at which the valve disc 22 is separated from the valve seat 20, the fluid control valve 10 may be provided with a throttle portion 106 illustrated in FIGS. 5 to 7 instead of the throttle portion 70. As illustrated in FIG. 5, the throttle portion 106 is an elastic piece covering the overall opening 86 and the peripheral portion 103 when the piston 18 is in the valve closed position. When the piston 18 is displaced from the valve closed position toward the valve open position, the throttle portion 106 can be elastically deformed in a direction away from the opening 86 as illustrated in FIG. 6 under the pressure of the working fluid flowing into the first pilot chamber 64 via the opening 86.

Moreover, an elongated depression 108 (FIG. 7) extending in the Y1 and Y2 directions is formed in the outer circumference of the throttle portion 106 so that, when the throttle portion 106 covers the peripheral portion 103, the throttle path 104 remains regardless of the internal pressure in the first pilot chamber 64.

Instead of or in addition to the depression 108, a protrusion (not illustrated) including a protruding rib or a projection may be formed on the outer circumference of the throttle portion 106. The end face of the protruding rib or projection may be formed of a flat surface, a spherical surface, a curved surface, or the like. Moreover, the number of depressions 108 and the number of protrusions formed on the outer circumference of the throttle portion 106 are not limited in particular, and may be one, or two or more. Furthermore, the depression 108 and the protrusion may be provided in the peripheral portion 103, not in the throttle portion 106.

In the fluid control valve 10 provided with the throttle portion 106, when the piston 18 is displaced from the valve closed position toward the valve open position, the throttle portion 106 can be separated from the opening 86 as illustrated in FIG. 6. Thus, the cross-sectional area of the throttle path 104 can be increased accordingly. As a result, the flow rate of the working fluid flowing into the first pilot chamber 64 can be increased, and thus the speed at which the valve disc 22 is separated from the valve seat 20 can be increased. That is, the fluid control valve 10 enables the time between when the piston 18 starts being displaced toward the valve open position and when the valve is opened to be reduced.

When the internal pressure in the first pilot chamber 64 increases while the piston 18 is in the valve closed position as illustrated in FIG. 5, the throttle portion 106 formed of the elastic piece can be easily deformed in a direction along which the throttle portion 106 is pressed against the opening 86 and the peripheral portion 103. Even when the throttle portion 106 is pressed against the opening 86 and the peripheral portion 103 as described above, the throttle path 104 remains between the throttle portion 106 and the peripheral portion 103 since at least one of the depression 108 and the protrusion is disposed between the throttle portion 106 and the peripheral portion 103. Since the working fluid can flow into the first pilot chamber 64 smoothly via the throttle path 104, the piston 18 can be promptly displaced toward the valve open position.

Figure 8:
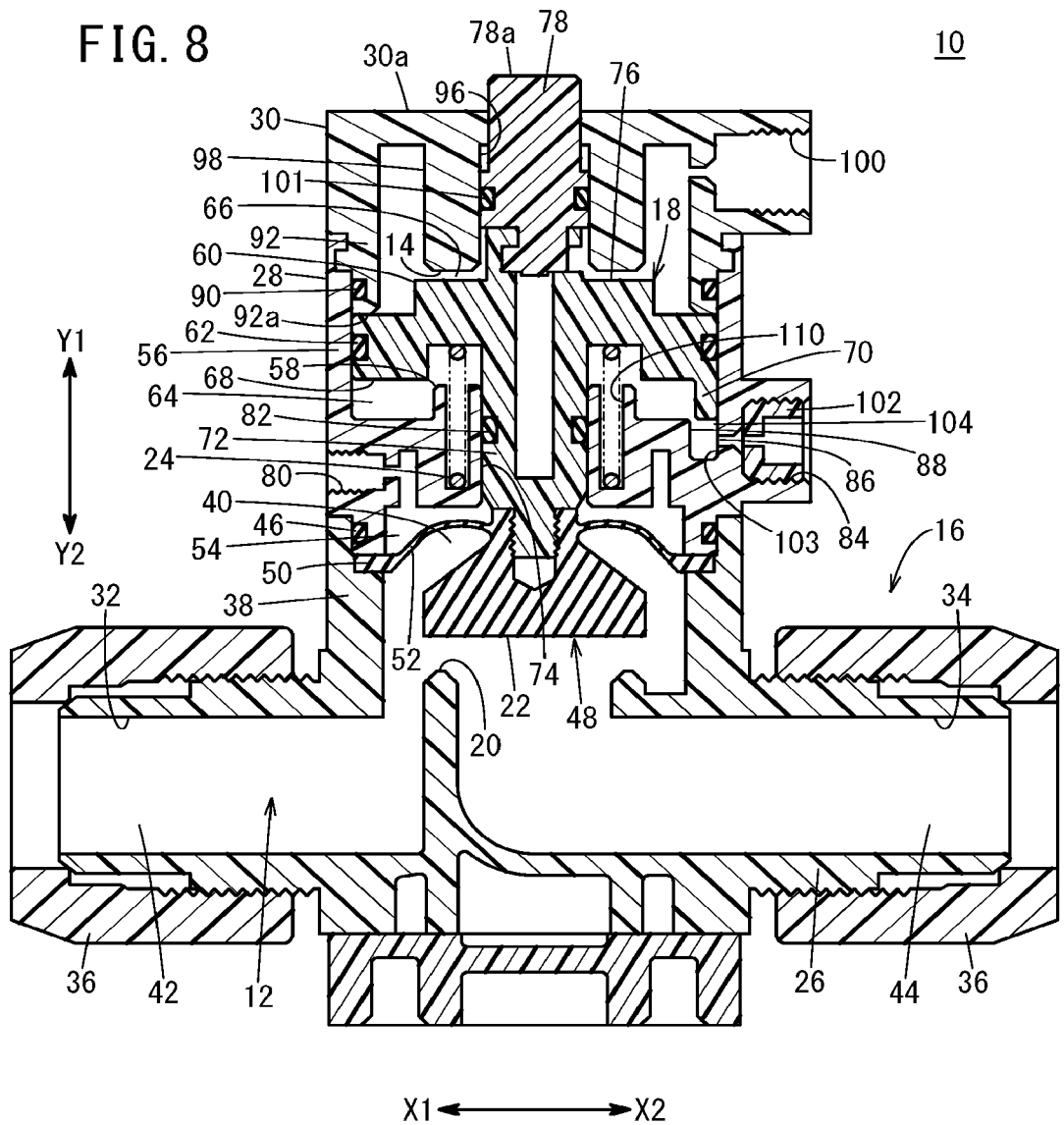
FIG. 8 is a schematic cross-sectional view of a fluid control valve according to yet another modification of the embodiment in FIG. 1.
Figure 9:
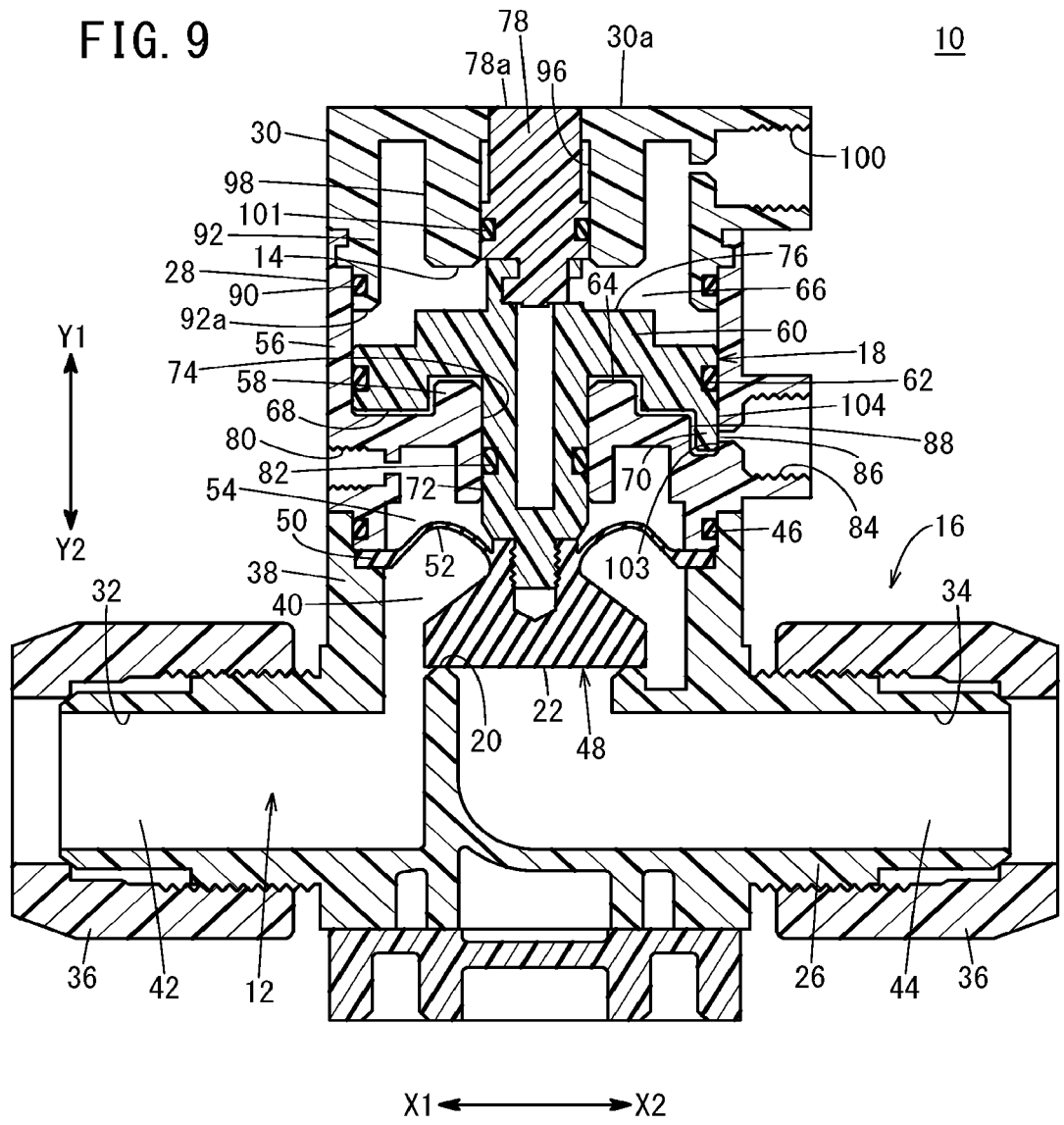
FIG. 9 is a schematic cross-sectional view of a fluid control valve according to yet another modification of the embodiment in FIG. 1.
Figure 10:
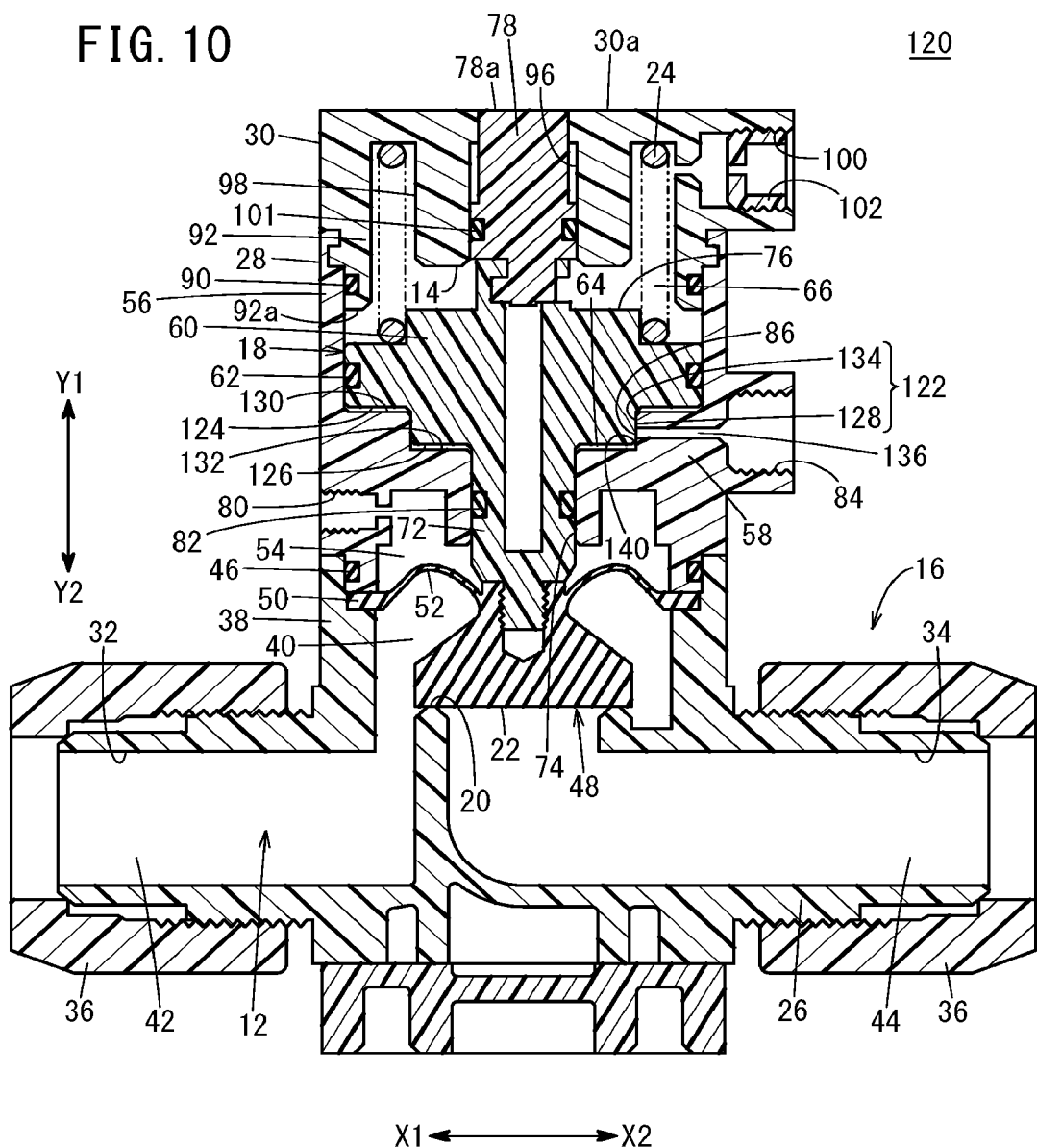
FIG. 10 is a schematic cross-sectional view of a fluid control valve according to a second embodiment of the present invention.

As illustrated in FIGS. 1 to 6, the fluid control valve 10 is of the normally closed type. However, the fluid control valve 10 is not limited in particular to this and may be of the normally open type as illustrated in FIG. 8 or of the double-acting type as illustrated in FIG. 9. Either the normally open type or the double-acting type can produce the above-described operational effects as does the normally closed type.

In the case where the fluid control valve 10 is of the normally open type as illustrated in FIG. 8, the biasing member 24 is accommodated in an accommodating groove 110 provided for the flange portion 58 of the first housing 28. The accommodating groove 110 communicates with the first pilot chamber 64. The biasing member 24 is disposed between the accommodating groove 110 and the first pressure receiving surface 68 of the piston 18 such that energy is stored in the biasing member 24. Thus, the piston 18 is elastically biased in a direction along which the valve disc 22 is separated from the valve seat 20 (in the Y1 direction) at all times. That is, the elastic force of the biasing member 24 serves as the valve opening pressure causing the piston 18 to move toward the valve open position.

Moreover, in the fluid control valve 10 of the normally open type, the supply source of the working fluid is connected to the second pilot port 100. The port plug 102 may be fitted in the first pilot port 84 functioning as a breather port. That is, in the fluid control valve 10 of the normally open type, when the piston 18 is in the valve open position by the valve opening pressure applied by the biasing member 24, the first pilot chamber 64 accommodates the air (fluid) taken in via the first pilot port 84. In a case where the environment of the fluid control valve 10 is filled with fluid other than the air, the first pilot chamber 64 may accommodate the fluid.

When the working fluid is supplied to the second pilot chamber 66 via the second pilot port 100, the second pressure receiving surface 76 of the piston 18 receives the valve closing pressure in accordance with the pressure of the working fluid inside the second pilot chamber 66.

When the valve closing pressure becomes higher than the valve opening pressure due to the working fluid supplied to the second pilot chamber 66 while the piston 18 is in the valve open position, the piston 18 is displaced toward the valve closed position. At this moment, the air inside the first pilot chamber 64 is discharged to the first pilot port 84 via the opening 86. When the piston 18 is displaced from the valve open position toward the valve closed position by a predetermined distance, the throttle path 104 is formed by the throttle portion 70. Thus, the air is discharged from the first pilot chamber 64 to the outside of the opening 86 via the throttle path 104.

As a result, also in the fluid control valve 10 of the normally open type, the discharge rate of the air discharged from the first pilot chamber 64 can be reduced before the valve disc 22, which has approached the valve seat 20, is seated on the valve seat 20 so that the displacement speed of the piston 18 can be reduced. As a result, the valve disc 22 can be seated on the valve seat 20 at low speed, and the impact occurring when the valve disc 22 is seated on the valve seat 20 can be reduced.

Moreover, the air can be discharged to the outside of the opening 86 at a flow rate in accordance with the cross-sectional area of the throttle path 104 even when the throttle path 104 is formed by the throttle portion 70. Thus, the piston 18 can be displaced to the valve closed position without increasing the valve closing pressure, in other words, without increasing, for example, the diameter of the piston 18 or the cylinder chamber 14.

That is, the above-described operational effects can be produced in a similar manner either in the case where the fluid discharged from the first pilot chamber 64 via the throttle path 104 and the opening 86 is the working fluid as in the fluid control valve 10 of the normally closed type illustrated in FIGS. 1 to 6 or in the case where the fluid is the air or the like as in the fluid control valve 10 of the normally open type illustrated in FIG. 8.

As illustrated in FIG. 9, the fluid control valve 10 of the double-acting type is not provided with the biasing member 24, and a supply source of the working fluid is connected to each of the first pilot port 84 and the second pilot port 100. When the working fluid is supplied to the first pilot chamber 64 via the first pilot port 84, the first pressure receiving surface 68 of the piston 18 receives the valve opening pressure in accordance with the pressure of the working fluid inside the first pilot chamber 64. When the working fluid is supplied to the second pilot chamber 66 via the second pilot port 100, the second pressure receiving surface 76 of the piston 18 receives the valve closing pressure in accordance with the pressure of the working fluid inside the second pilot chamber 66.

That is, the fluid control valve 10 of the double-acting type illustrated in FIG. 9 allows the working fluid in the first pilot chamber 64 to be discharged via the throttle path 104 and the opening 86 as does the fluid control valve 10 of the normally closed type illustrated in FIGS. 1 to 6, and thus produces the above-described operational effects in a similar manner.

Next, a fluid control valve 120 according to a second embodiment will be described with reference to FIGS. 10 to 14. The fluid control valve 120 includes a throttle portion 122 provided for both the piston 18 and the valve body 16 instead of the throttle portion 70 provided on the outer circumference side of the piston 18 as described above. Specifically, the fluid control valve 120 according to the second embodiment illustrated in FIGS. 11 to 13 and the fluid control valve 10 according to the first embodiment illustrated in FIGS. 2 and 3 have similar structures except for the shape of the piston body portion 60 on the first pressure receiving surface 68 side and the shape of the flange portion 58 on the Y1 side.

Figure 11:
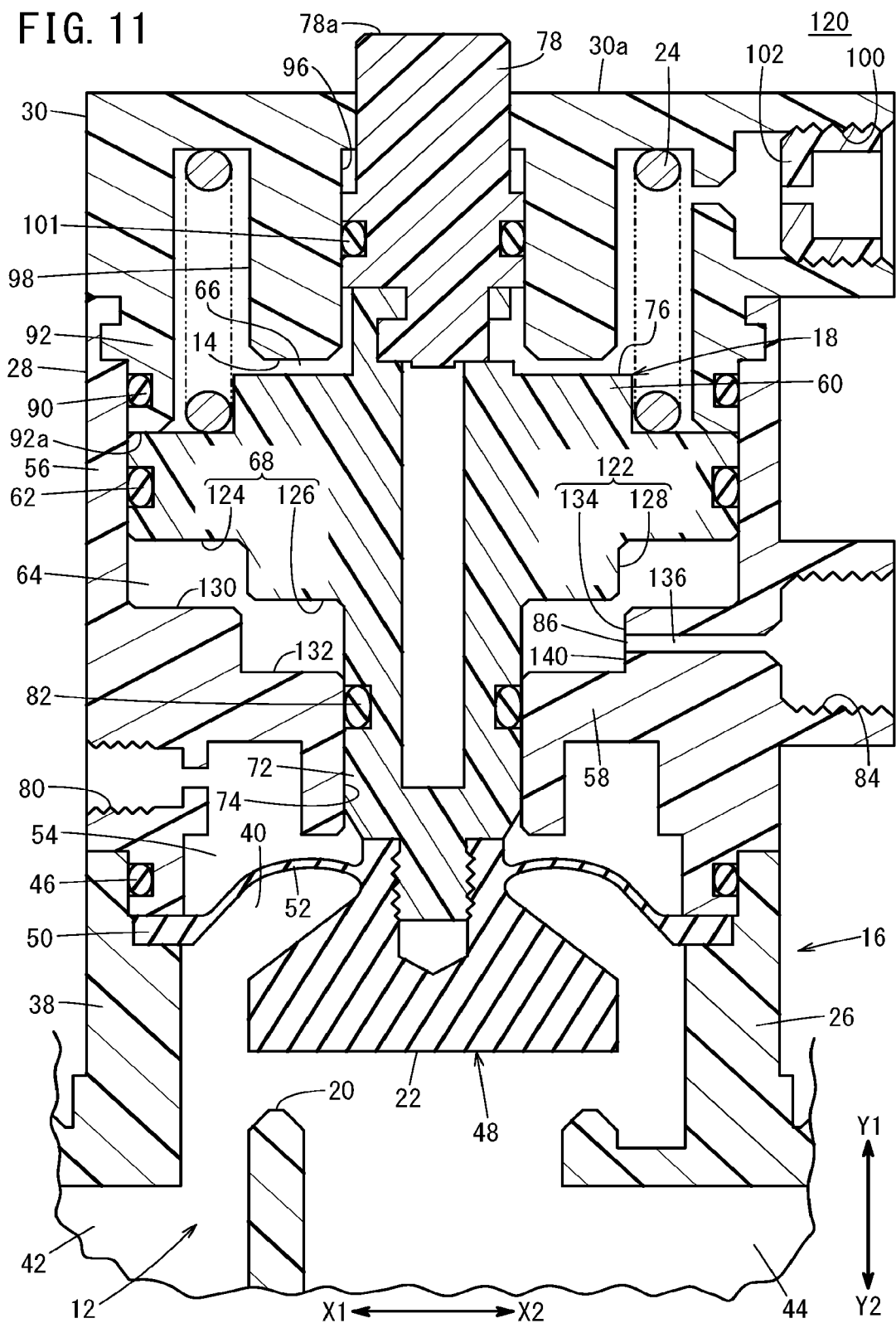
FIG. 11 is a schematic cross-sectional view of a principal part of the fluid control valve in FIG. 10 when the valve is open.
Figure 12:
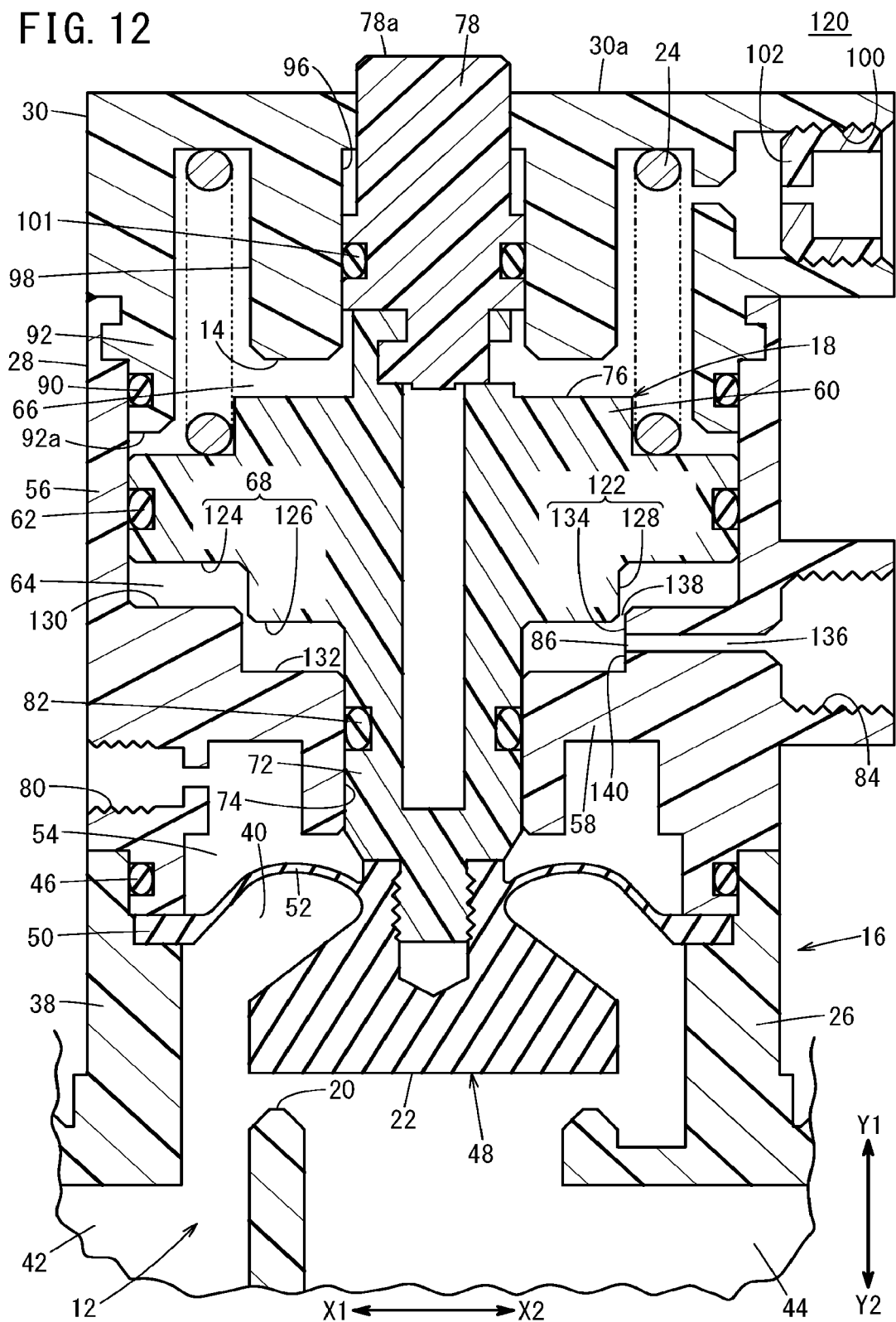
FIG. 12 illustrates a state in which a piston of the fluid control valve in FIG. 11 approaches a valve closed position.
Figure 13:
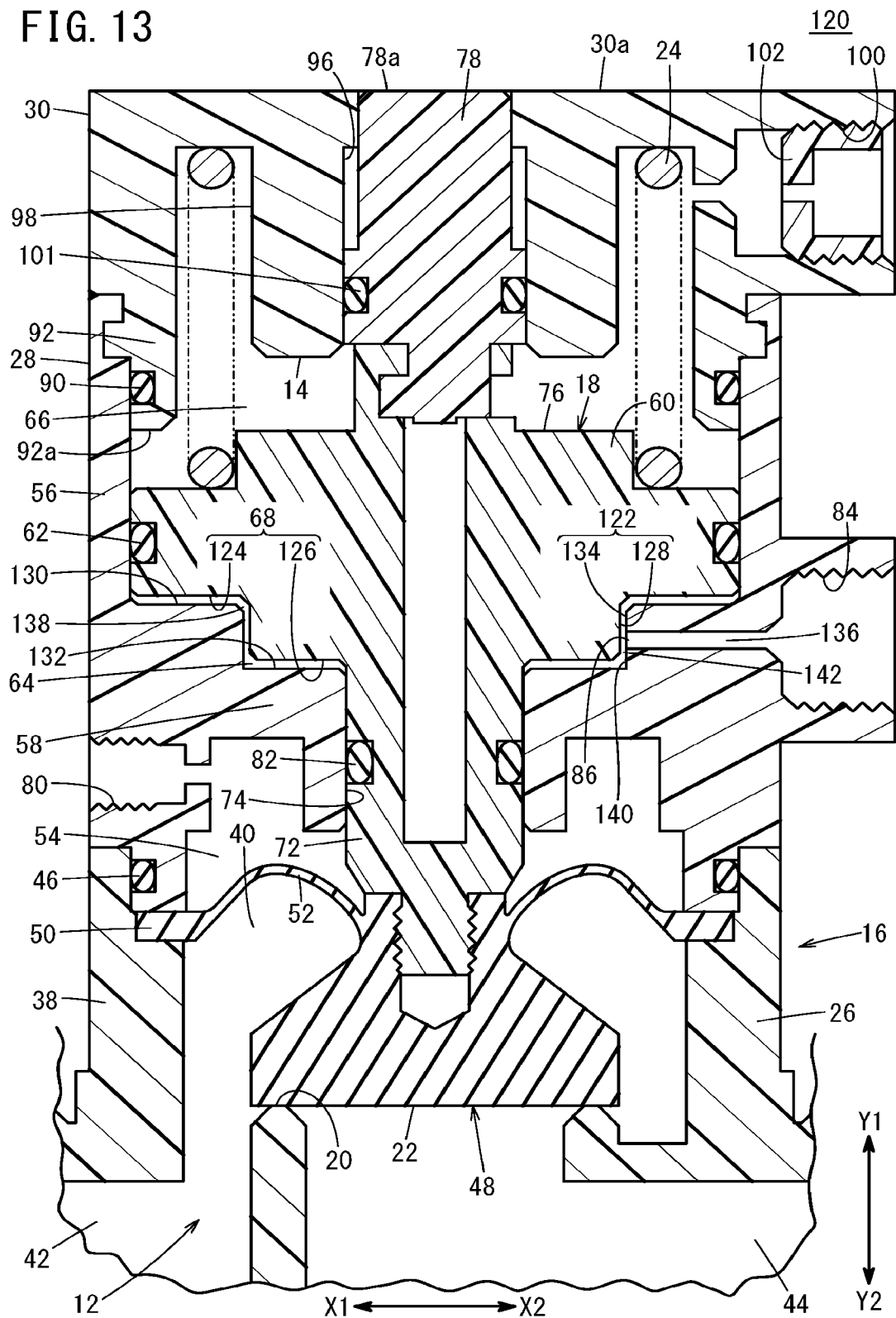
FIG. 13 is a schematic cross-sectional view of the principal part of the fluid control valve in FIG. 10 when the valve is closed.

As illustrated in FIGS. 11 to 13, the first pressure receiving surface 68 (pressure receiving surface) of the piston 18 includes an outer pressure receiving surface 124 disposed on the outer circumference side and an inner pressure receiving surface 126 disposed on the inner circumference side. A piston riser surface 128 extending in the sliding directions (the Y1 and Y2 directions) is formed between the outer pressure receiving surface 124 and the inner pressure receiving surface 126.

The end face of the flange portion 58 on the Y1 side constituting the inner wall of the first pilot chamber 64 includes an outer opposing surface 130 opposing the outer pressure receiving surface 124 and an inner opposing surface 132 opposing the inner pressure receiving surface 126. Moreover, an inner wall riser surface 134 extending in the Y1 and Y2 directions is formed between the outer opposing surface 130 and the inner opposing surface 132. The inner wall riser surface 134 is provided with the opening 86 of the first pilot port 84. That is, a through-passage 136 passing through the flange portion 58 in the X1 and X2 directions is provided between the first pilot port 84 and the opening 86.

Figure 14:
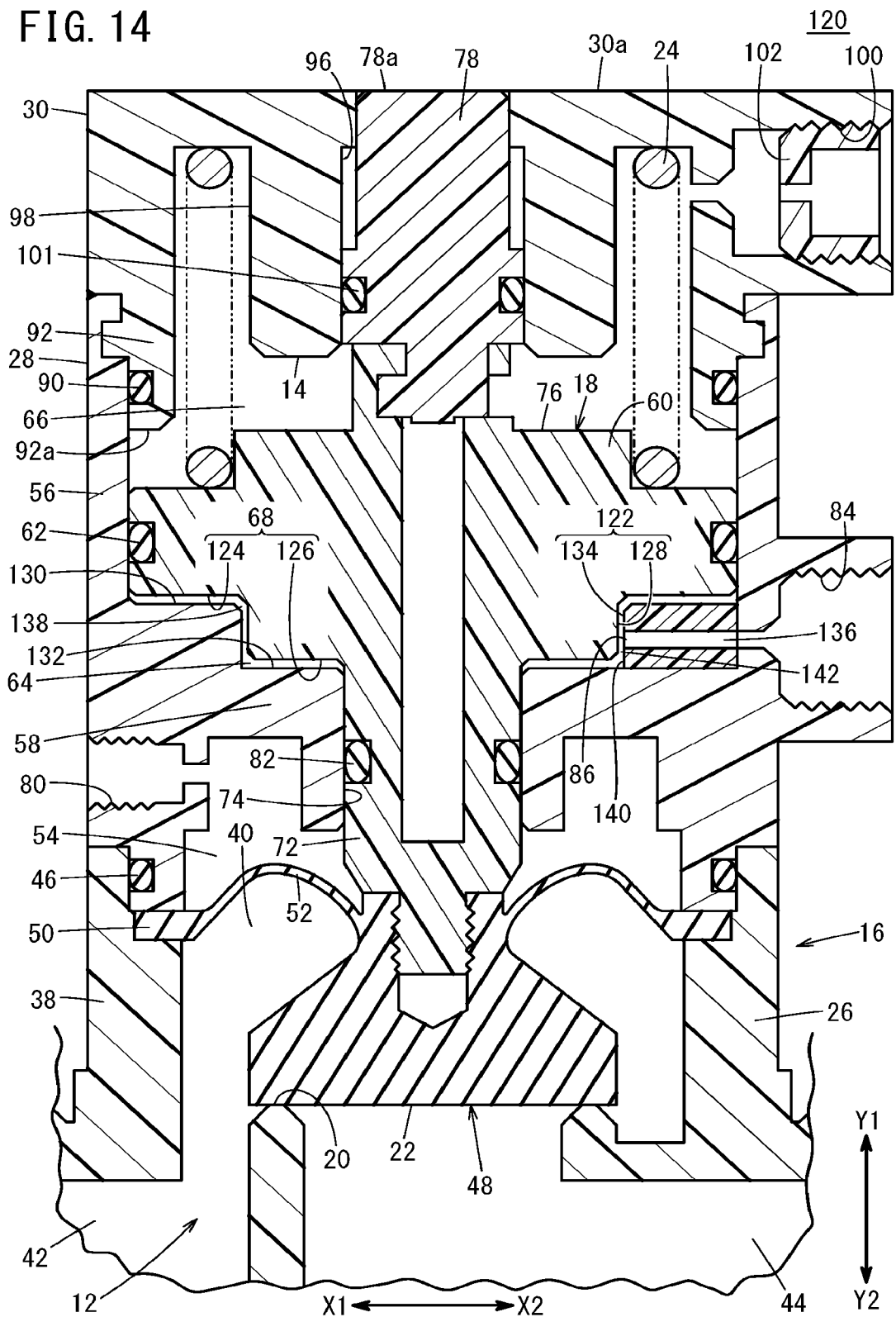
FIG. 14 is a schematic cross-sectional view of a fluid control valve according to a modification of the embodiment in FIG. 10.

As illustrated in FIG. 14, the part of the flange portion 58 where the through-passage 136 is provided may be formed separately from the first housing 28 of the valve body 16 and then integrated with the first housing 28 to constitute the valve body 16.

The piston riser surface 128 and the inner wall riser surface 134 constitute the throttle portion 122. The piston riser surface 128 approaches the inner wall riser surface 134 as the piston 18 is displaced from the valve open position (FIG. 11) toward the valve closed position. As illustrated in FIG. 12, when the piston 18 is displaced from the valve open position toward the valve closed position by a predetermined distance, the piston riser surface 128 starts opposing the inner wall riser surface 134. As a result of this, a first throttle path 138 (throttle path) having a cross-sectional area smaller than the area of the opening 86 and allowing the communication between the opening 86 and the first pilot chamber 64 is formed between the piston riser surface 128 and the inner wall riser surface 134 opposing each other. This enables the discharge rate of the working fluid discharged from the first pilot chamber 64 to be reduced.

As illustrated in FIG. 13, as the piston 18 further approaches the valve closed position, the piston riser surface 128 covers the overall opening 86 and a peripheral portion 140 around the opening 86 in the inner wall riser surface 134. As a result of this, a second throttle path 142 (throttle path) having a cross-sectional area smaller than the area of the opening 86 and allowing the communication between the opening 86 and the first pilot chamber 64 is formed between the peripheral portion 140 and the piston riser surface 128. This enables the discharge rate of the working fluid discharged from the first pilot chamber 64 to be further reduced.

In the fluid control valve 120 according to the second embodiment configured as above, the first throttle path 138 (FIG. 12) and the second throttle path 142 (FIG. 13) are formed in stages as the piston 18 is displaced toward the valve closed position. As a result, since the displacement speed of the piston 18 can be effectively reduced before the valve disc 22 is seated on the valve seat 20, the valve disc 22 can be seated on the valve seat 20 at low speed more reliably, and the impact occurring during the seating can be reduced.

Moreover, since the working fluid can be discharged from the first pilot chamber 64 via both the first throttle path 138 and the second throttle path 142, the internal pressure in the first pilot chamber 64 increased as above can be promptly reduced. Thus, the piston 18 can be displaced to the valve closed position without increasing the valve closing pressure, in other words, without increasing, for example, the diameter of the piston 18 or the cylinder chamber 14.

In this manner, as does the fluid control valve 10 according to the first embodiment, the fluid control valve 120 according to the second embodiment enables the valve disc 22 to be seated on the valve seat 20 at low speed to reduce the impact occurring during the seating, without being increased in size.

Figure 15:
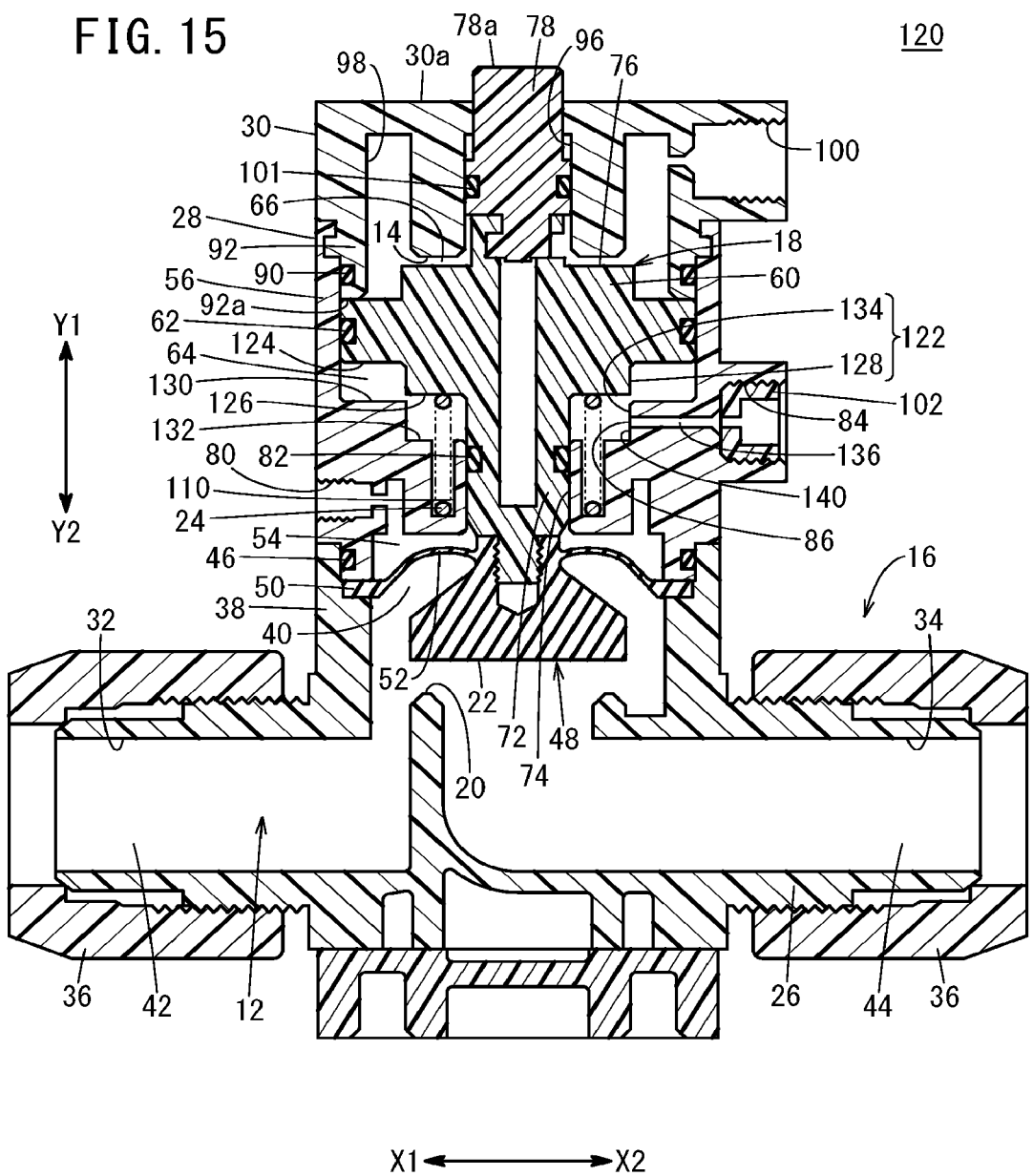
FIG. 15 is a schematic cross-sectional view of a fluid control valve according to another modification of the embodiment in FIG. 10.
Figure 16:
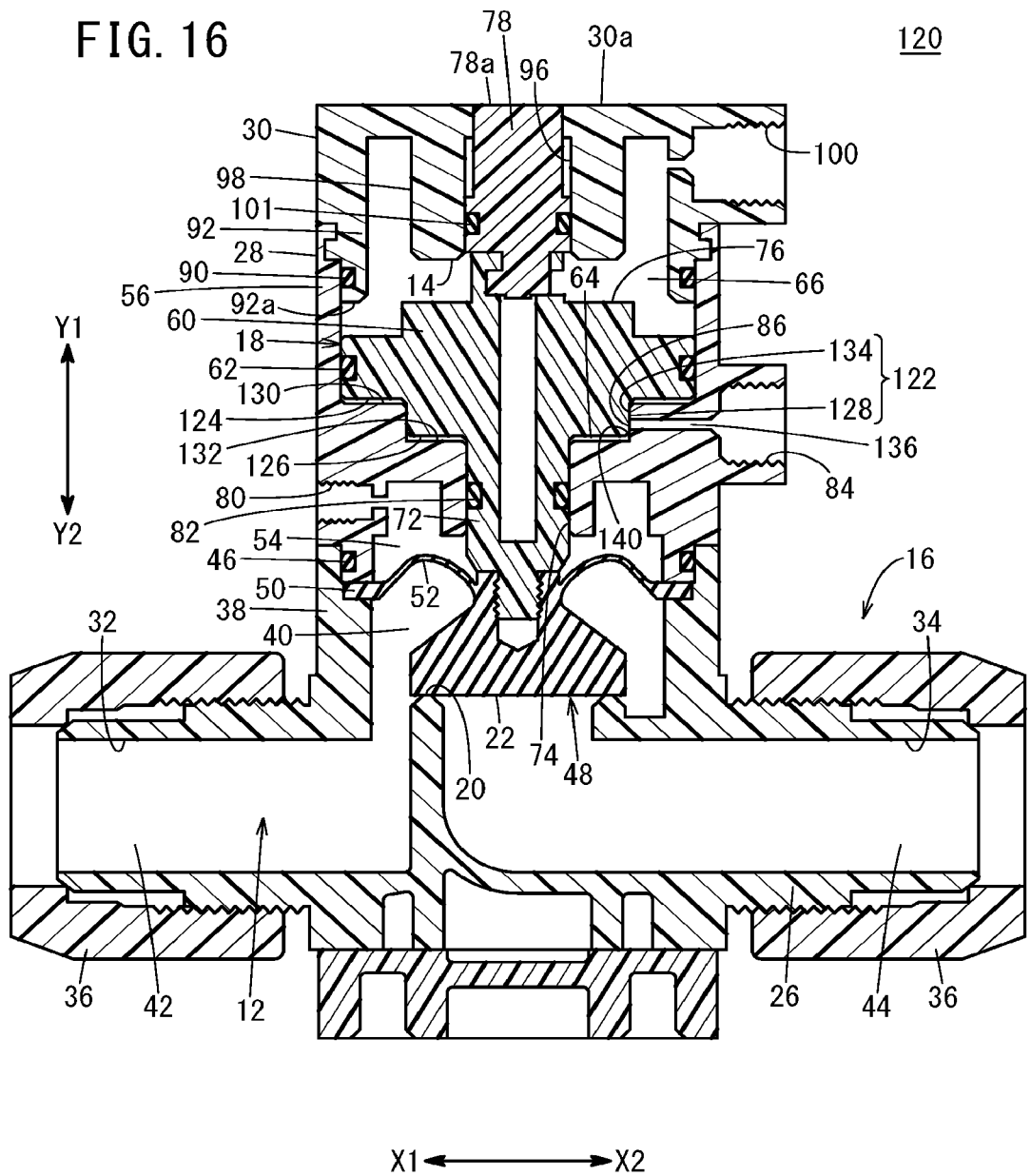
FIG. 16 is a schematic cross-sectional view of a fluid control valve according to yet another modification of the second embodiment.

As illustrated in FIGS. 11 to 14, the fluid control valve 120 is of the normally closed type. However, as in the first embodiment, the fluid control valve 120 according to the second embodiment may be of the normally open type as illustrated in FIG. 15 or of the double-acting type as illustrated in FIG. 16.

The present invention is not limited in particular to the embodiments described above, and various modifications can be made thereto without departing from the scope of the present invention.

For example, the fluid control valve 10 according to the first embodiment and the fluid control valve 120 according to the second embodiment do not necessarily include the indicator 78. In this case, instead of the indicator insertion hole 96, the second housing 30 may have a bottomed hole (not illustrated) that does not have an opening in the end face 30a. Moreover, instead of the indicator 78, the fluid control valves 10 and 120 may be provided with a flow rate adjustment mechanism or the like (not illustrated) capable of adjusting the flow rate of the fluid to be controlled flowing in the flow path 12 by, for example, adjusting the amount of stroke of the piston 18. Furthermore, the indicator insertion hole 96 may have a structure in which either the indicator 78 or the flow rate adjustment mechanism can be fitted so that the fluid control valves 10 and 120 can be selectively provided with the indicator 78 or the flow rate adjustment mechanism.

What is claimed is:
1. A fluid control valve, comprising:
a valve body provided with a flow path of fluid to be controlled, and a cylinder chamber;
a piston configured to slide inside the cylinder chamber in sliding directions under working pressure; and
a valve disc displaced together with the piston in an integrated manner to be separated from and seated on a valve seat provided in the flow path to open and close the flow path, wherein:
the cylinder chamber includes a pilot chamber extending from the piston in one of the sliding directions;

an opening of a port is created in an inner wall of the pilot chamber, fluid being supplied to and discharged from the pilot chamber through the opening;

the fluid is accommodated in the pilot chamber when the piston is in a valve open position in which the valve disc is separated from the valve seat;

the fluid inside the pilot chamber is discharged to the port via the opening when the piston is displaced toward a valve closed position in which the valve disc is seated on the valve seat;

at least one of the piston and the valve body is provided with a throttle portion forming, between the piston and the valve body, a throttle path having a cross-sectional area smaller than an area of the opening, after the piston starts being displaced from the valve open position toward the valve closed position;

the throttle portion is provided on an outer circumference side of the piston sliding along the inner wall of the pilot chamber;

when the piston is in the valve closed position, the throttle portion covers the opening and a peripheral portion around the opening in the inner wall of the pilot chamber, and the throttle path allowing communication between the opening and the pilot chamber is formed between the peripheral portion and the throttle portion; and the throttle portion is configured to be deformed in a direction away from the opening under pressure of the fluid flowing into the pilot chamber via the opening, when the piston in the valve closed position is displaced toward the valve open position.

2. The fluid control valve according to claim 1, wherein the throttle portion is an elastic piece covering the opening and the peripheral portion when the piston is in the valve closed position.

3. The fluid control valve according to claim 1, wherein at least one of the throttle portion and the peripheral portion is provided with at least one of a depression and a protrusion configured to, when the throttle portion covers the peripheral portion, maintain the throttle path regardless of an internal pressure in the pilot chamber.

4. The fluid control valve according to claim 1, wherein: the piston includes a pressure receiving surface configured to receive the working pressure inside the pilot chamber; the pressure receiving surface includes an outer pressure receiving surface disposed on an outer circumference side of the pressure receiving surface and an inner pressure receiving surface disposed on an inner circumference side of the pressure receiving surface; a piston riser surface extending in the sliding directions is disposed between the outer pressure receiving surface and the inner pressure receiving surface; the inner wall of the pilot chamber includes an outer opposing surface opposing the outer pressure receiving surface and an inner opposing surface opposing the inner pressure receiving surface; an inner wall riser surface is formed between the outer opposing surface and the inner opposing surface; the piston riser surface and the inner wall riser surface constitute the throttle portion; and by displacement of the piston from the valve open position toward the valve closed position, the throttle path is formed between the piston riser surface and the inner wall riser surface opposing each other.

* * * * *